US009053556B2

(12) United States Patent
Matsuhira et al.

(10) Patent No.: US 9,053,556 B2
(45) Date of Patent: Jun. 9, 2015

(54) IMAGE PROCESSING APPARATUS FOR PANORAMIC SYNTHESIS OF A PLURALITY OF SUB-IMAGES

(75) Inventors: Masatoshi Matsuhira, Suwa (JP); Kosuke Shingai, Suwa (JP); Makoto Oyanagi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 998 days.

(21) Appl. No.: 12/608,945

(22) Filed: Oct. 29, 2009

(65) Prior Publication Data
US 2010/0111408 A1    May 6, 2010

(30) Foreign Application Priority Data
Oct. 30, 2008    (JP) ................. 2008-279372

(51) Int. Cl.
*G06K 9/36*    (2006.01)
*G06T 3/40*    (2006.01)

(52) U.S. Cl.
CPC .................... *G06T 3/4038* (2013.01)

(58) Field of Classification Search
None
See application file for complete search history.

(56) References Cited

U.S. PATENT DOCUMENTS

| | | | |
|---|---|---|---|
| 6,906,826 B1 | 6/2005 | Kuwata et al. | |
| 7,526,113 B2* | 4/2009 | Jacob et al. | 382/128 |
| 7,907,752 B2* | 3/2011 | Kasugai et al. | 382/103 |
| 7,925,047 B2* | 4/2011 | Xiao et al. | 382/103 |
| 7,995,741 B1* | 8/2011 | Blair et al. | 379/265.02 |
| 8,274,572 B2* | 9/2012 | Okamoto et al. | 348/218.1 |
| 2002/0122113 A1* | 9/2002 | Foote | 348/48 |
| 2002/0122605 A1 | 9/2002 | Chang | |
| 2003/0133019 A1* | 7/2003 | Higurashi et al. | 348/218.1 |
| 2005/0117925 A1* | 6/2005 | Tanaka et al. | 399/49 |
| 2005/0243349 A1* | 11/2005 | Aoyama | 358/1.9 |
| 2006/0268103 A1* | 11/2006 | Kweon et al. | 348/36 |
| 2007/0058858 A1* | 3/2007 | Harville et al. | 382/165 |
| 2007/0196097 A1* | 8/2007 | Sugimoto | 396/234 |
| 2008/0024643 A1* | 1/2008 | Kato | 348/333.01 |
| 2008/0285853 A1* | 11/2008 | Bressan | 382/169 |
| 2008/0316372 A1* | 12/2008 | Xu et al. | 348/739 |
| 2009/0021602 A1* | 1/2009 | Fujiwara et al. | 348/223.1 |
| 2009/0041355 A1* | 2/2009 | Sakaji et al. | 382/190 |
| 2009/0092294 A1* | 4/2009 | Uchida | 382/118 |
| 2009/0284611 A1* | 11/2009 | Wood et al. | 348/211.1 |
| 2009/0310845 A1* | 12/2009 | Ogawa et al. | 382/132 |
| 2010/0289922 A1* | 11/2010 | Brenner et al. | 348/231.99 |

FOREIGN PATENT DOCUMENTS

| | | | |
|---|---|---|---|
| JP | 2000-215306 A | 4/2000 | |
| JP | 2000-175185 A | 6/2000 | |
| JP | 2000-215322 A | 8/2000 | |
| JP | 2001-167110 A | 6/2001 | |
| JP | 2002-305732 A | 10/2002 | |
| JP | 2004-056497 A | 2/2004 | |

(Continued)

*Primary Examiner* — Michelle Entezari
(74) *Attorney, Agent, or Firm* — Kilpatrick Townsend & Stockton LLP

(57) ABSTRACT

An image processing apparatus synthesizing a plurality of sub-images in a panoramic way to create a panoramic image includes a face recognizing unit recognizing a person's face from a plurality of the sub-images, a sampling image selecting unit selecting a sub-image which has a face recognized by the face recognizing unit, out of a plurality of the sub-images as a sampling image, a sampling unit sampling a plurality of pixels from the selected sampling image.

4 Claims, 13 Drawing Sheets

(56) References Cited

FOREIGN PATENT DOCUMENTS

| JP | 2005-244536 A | 9/2005 |
| JP | 2007-164247 A | 6/2007 |
| JP | 2007-193590 A | 8/2007 |
| JP | 2008/042801 A | 2/2008 |

* cited by examiner

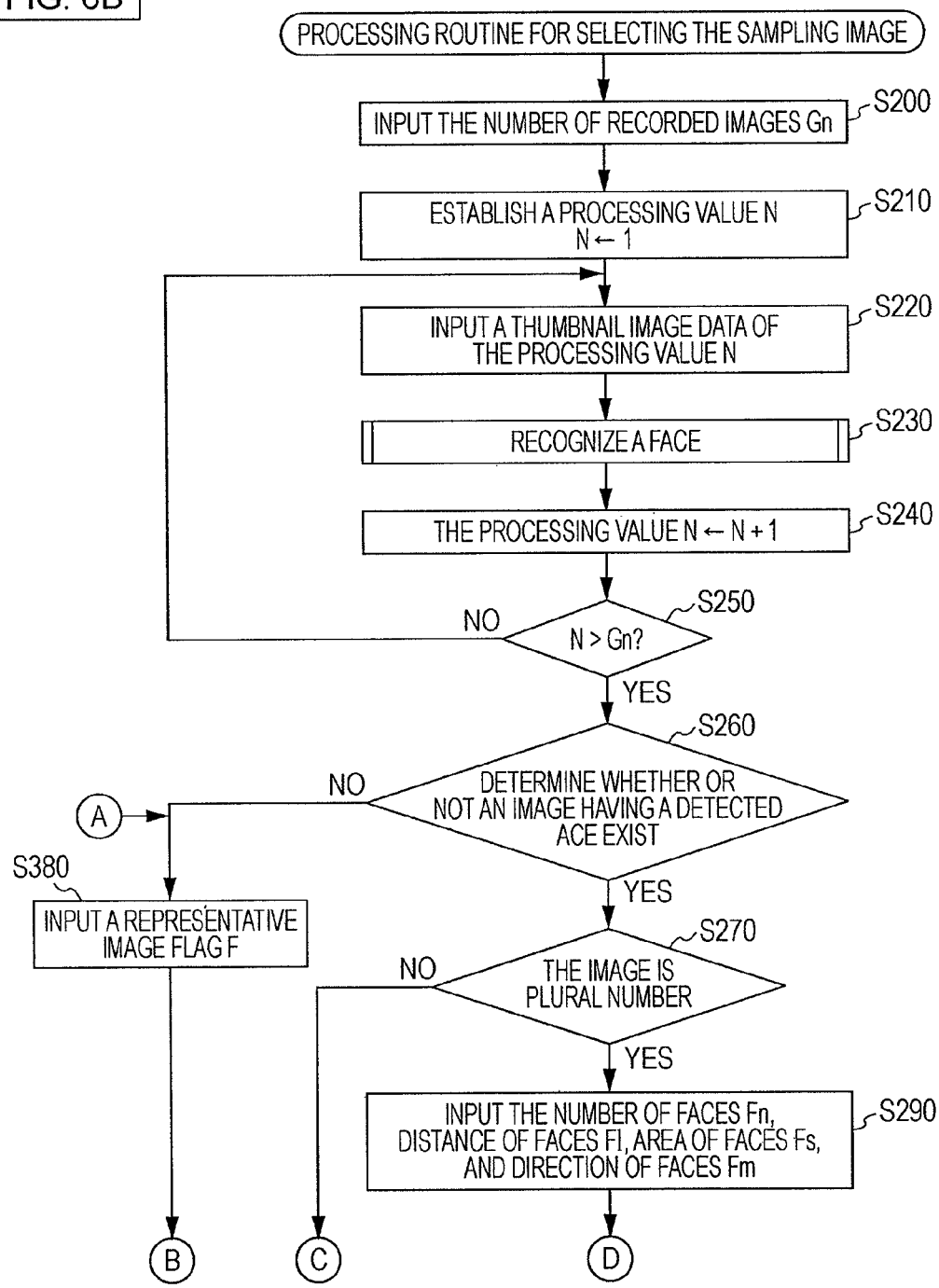

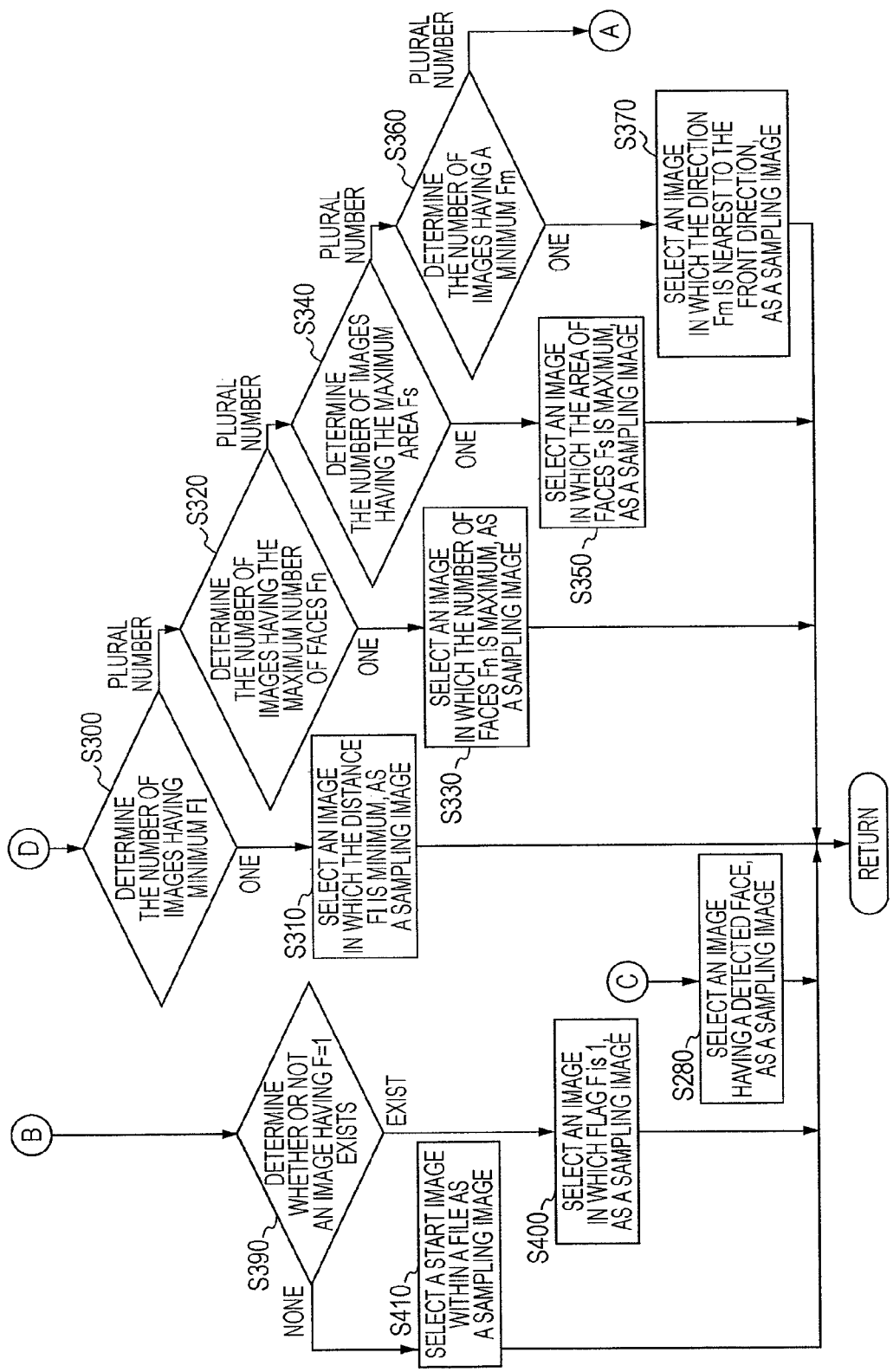

| NUMBER | FACE | NUMBER Fn | AREA Fs | DISTANCE Fl | DIRECTION Fm |
|---|---|---|---|---|---|
| 1 | — | — | — | — | — |
| 2 | — | — | — | — | — |
| 3 | — | — | — | — | — |
| 4 | — | — | — | — | — |
| 5 | EXIST | 1 | Fs1 | Fl1 | RIGHT (Ra degrees) |
| 6 | EXIST | 1 | Fs2 | Fl2 | FRONT (0 degree) |
| 7 | EXIST | 3 | Fs3 | Fl3 | LEFT (La degrees) |
|   |       |   | Fs4 | Fl4 | LEFT (Lb degrees) |
|   |       |   | Fs5 | Fl5 | LEFT (Lc degrees) |
| 8 | — | — | — | — | — |
| 9 | — | — | — | — | — |

IMAGE PROCESSING APPARATUS FOR PANORAMIC SYNTHESIS OF A PLURALITY OF SUB-IMAGES

This application claims priority to Japanese Patent Application No. 2008-279372, filed Oct. 30, 2008, the entirety of which is incorporated by reference herein.

BACKGROUND

1. Technical Field

The present invention relates generally to an image processing apparatus and a program, in particular, an image processing apparatus capable of synthesizing a plurality of sub-images in a panoramic way and creating a panoramic image, and an image processing program capable of serving a computer as an image processing apparatus.

2. Related Art

In the past, for such an image processing apparatus, an approach in which a plurality of images photographed by a digital camera is corrected by adjusting brightness or a contrast etc. is proposed (for example, see JP-A-2000-215306). Further, for such an image processing apparatus, another approach is proposed, in which all images are corrected based on the correction parameter obtained from one image, in addition to correcting each image respectively based on a correction parameter obtained by interpreting a pixel sampled from a plurality of images (for example, see JP-A-2007-164247). Specifically, the desired item is established out of brightness or chroma etc., an image in which the value of the established item approximates to the average value is selected by interpreting a plurality of images, and a correction parameter is established by interpreting the selected image. Subsequently, all images are corrected based on the thus established correction parameter, and thereby the image quality between the respective images can be prevented from, to a large extent, being non-uniform after the correction of the plurality of images.

Nonetheless, when a panoramic image is created by synthesizing a plurality of sub-images in a panoramic way, it is required that the entire panoramic image is corrected using the same correction parameter not so as to change to a great extent the brightness or chroma etc. of a part of the panoramic image. In this case, even though a correction parameter can be obtained by interpreting pixels sampled from the panoramic image in which sub-images are synthesized in a panoramic way, it takes much more time to synthesize all the sub-images because the panoramic image is larger than the sub-images before synthesization. Thus, in order to reduce the synthesization time, similarly to the image processing apparatus described above, it is considered that the correction parameter is set up by selecting one sub-image from a plurality of sub-images and interpreting the selected sub-image. Nevertheless, even though the correction parameter is established simply by selecting an sub-image in which the value of an item such as brightness, chroma, etc. approximates to the average value, it is difficult to accomplish user-desired image correction because an attractive main portion exists in the panoramic image and the sub-images corresponding to the main portion are a portion of a plurality of sub-images.

SUMMARY

An advantage of some aspects of the invention is that when a plurality of sub-images is synthesized in a panoramic way to generate a panoramic image, the entire panoramic image is corrected well by simple processes.

According to a first aspect of the invention, an image processing apparatus synthesizing a plurality of sub-images in a panoramic way to create a panoramic image includes a face recognizing unit recognizing a person's face from a plurality of the sub-images, a sampling image selecting unit selecting a sub-image having faces recognized by the face recognizing unit, out of a plurality of the sub-images as a sampling image, a sampling unit sampling a plurality of pixels from the selected sampling image, a correction parameter establishing unit extracting features from a plurality of the sampled pixels and establishing a correction parameter for image correction based on the extracted features, and an image processing unit synthesizing a plurality of the sub-images in a panoramic way and simultaneously correcting the entire panoramic image based on the established correction parameter.

According to the aspect of the invention, sub-images having a face recognized from a plurality of sub-images are selected as a sampling image, features are extracted from a plurality of the sampled pixels from the selected sampling image, an image correction parameter is established based on the extracted features, and a plurality of sub-images is synthesized in a panoramic way and the entire panoramic image is simultaneously corrected based on the established correction parameter. In this case, when the panoramic image is an image including a person's face, the person's face is apt to be an attractive portion and thus usually the main portion of the panoramic image. Further, according to the aspect, since the correction parameter is established based on the sub-images having a recognized face, a suitable image correction for the main portion of the panoramic image can be performed on the entire panoramic image and thereby the correction can be accomplished as the user desires. In addition, since sub-images are selected as the sampling image, the correction is quickly processed as compared to a case in which pixels are sampled from the entire panoramic image. As a result, when a plurality of sub-images is synthesized in a panoramic way to create a panoramic image, the entire panoramic image can be corrected well by simple processes. In this case, as a plurality of the sub-images, the images associated with each other for a panoramic image and compatible with a standard for recording in one file may be used.

In this case, the face recognizing unit determines the position of the face recognized as belonging to a person, and the sampling image selecting unit selects a sub-image which includes the face disposed nearest to its center when synthesized in a panoramic way, as the sampling image, when plural sub-images having the recognized face exist. Further, the face recognizing unit determines the number of the faces recognized as belonging to a person, and the sampling image selecting unit selects the sub-image which has determined the highest number of faces, as the sampling image, when plural sub-images having the recognized face exist. Furthermore, the face recognizing unit determines the size of the face recognized as belonging to a person, and the sampling image selecting unit selects the sub-image which has the largest determined size of the faces, as the sampling image, when plural sub-images having the recognized face exist. Still further, the face recognizing unit determines the direction of the face recognized as belonging to a person, and the sampling image selecting unit selects the sub-image which has the determined direction of the faces nearest to the front direction, as the sampling image, when plural sub-images having the recognized face exist. In this case, as described above, while the face portion in a panoramic image is apt to catch a viewer's eye and therefore be an attractive portion, when plural faces belonging to people exist, a face near to the center of the image is apt to be more attractive than one existing on the periphery of the image. Similarly, a portion having a large number of faces is apt to be more attractive than one having a small number of faces, a portion having a large face is apt to be more attractive than one having a small face, and a portion having a face directed toward the front direction is apt to be attractive than one having a face directed away from the front direction. Thus, by selecting a sub-image having a more attractive face as described above out of a plurality of sub-images having a recognized face, as a sampling image, even though sub-images having a recognized face exist in a plural number, further improved and appropriate correction can be accomplished.

According to a second aspect of the invention, an image processing apparatus synthesizing a plurality of sub-images in a panoramic way to create a panoramic image includes a sampling image selecting unit determining a sub-image approximately disposed in the center of the panoramic image and selecting the determined sub-image as a sampling image out of a plurality of the sub-images, a sampling unit sampling a plurality of pixels from the selected sampling image, a correction parameter establishing unit extracting features from a plurality of the sampled pixels and establishing a correction parameter for image correction based on the extracted features, and an image processing unit synthesizing a plurality of the sub-images in a panoramic way and simultaneously correcting the entire panoramic image based on the established correction parameter.

According to the aspect of the invention, sub-images approximately arranged in the center of the panoramic image are determined from a plurality of sub-images, the determined sub-images are selected as a sampling image, features are extracted from a plurality of the sampled pixels from the selected sampling image, an image correction parameter is established based on the extracted features, and a plurality of the sub-images is synthesized in a panoramic way and the entire panoramic image is simultaneously corrected based on the established correction parameter. In this case, the main subject of the photograph is arranged in the center of the existing panoramic image. In addition, according to the aspect of the invention, since a correction parameter is established based on sub-images approximately arranged in the center of a panoramic image, suitable image correction for the main portion of the panoramic image can be performed on the entire panoramic image and thereby the correction can be accomplished as the user desires. Further, since sub-images are selected as a sampling image, the correction is quickly processed as compared to a case in which pixels are sampled from the entire panoramic image. As a result, when a plurality of sub-images is synthesized in a panoramic way to create a panoramic image, the entire panoramic image can be corrected well by simple processes. In this case, as a plurality of the sub-images, the images associated with each other for a panoramic image and compatible with a standard for recording in one file may be used.

In this case, images, in which the arrangement scheme of sub-images for synthesis in a panoramic way is selected and then preset by user from a plurality of the arrangement schemes and the sequence based on the preset arrangement scheme is simultaneously set as the image numbers of the respective sub-images, and the set arrangement scheme and the image number are registered as image information, are used as a plurality of the sub-images, and the sampling image selecting unit determines the sub-image disposed in approximately the center of the panoramic image based on the arranging scheme and the image number registered as the image information. Thus, the sub-images arranged in approximately the center of the panoramic image can be determined by simple processes.

According to a third aspect of the invention, an image processing apparatus synthesizing a plurality of sub-images in a panoramic way to create a panoramic image includes a sampling unit sampling a plurality of pixels from a plurality of the sub-images, a deviation determining unit creating a histogram indicating the relationship between pixel numbers and gradation values in color brightness for a plurality of the sub-images, from a plurality of the sampled pixels, and determining deviation between the average value and mode values calculated from the created histogram, a sampling image selecting unit selecting a sub-image having the smallest determined deviation, out of a plurality of the sub-images as the sampling image, a correction parameter establishing unit extracting features from a plurality of the pixels sampled from the selected sampling image and establishing a correction parameter for image correction based on the extracted features, and an image processing unit synthesizing a plurality of the sub-images in a panoramic way and simultaneously correcting the entire panoramic image based on the established correction parameter.

According to the aspect of the invention, histograms indicating the relationship between pixel numbers and gradation values in color brightness are created from a plurality of pixels sampled from a plurality of the sub-images, with respect to the respective plural sub-images, the deviation between an average value and a mode value calculated from the created histograms is determined, a sub-image in which the deviation determined from a plurality of sub-images is smallest is selected as a sampling image, features are extracted from a plurality of the pixels sampled from the selected sampling image, an image correction parameter is established based on the extracted features, and a plurality of sub-images is synthesized in a panoramic way and the entire panoramic image is simultaneously corrected based on the established correction parameter. In this case, a sub-image in which the deviation between an average value and the mode value calculated from the histograms is large has a great number of partially and extremely bright positions or extremely dark positions. Thus, if the entire panoramic image is corrected based on the correction parameter established depending on such a sub-image, the image quality would not be created as the user desires. According to the aspect, since the sub-image in which the deviation between an average value and a mode value is smallest, i.e., a uniform sub-image in which the number of extremely bright positions or dark positions is small, is selected as a sampling image, the correction can be obtained as the user desires. In addition, since sub-images are selected as a sampling image, the correction is quickly processed as compared to a case in which pixels are sampled from the entire panoramic image. As a result, when a plurality of sub-images is synthesized in a panoramic way to generate a panoramic image, the entire panoramic image is corrected well by simple processes. In this case, as a plurality of the sub-images, the images associated with each other for a panoramic image and compatible with a standard for recording in one file may be used.

According to a fourth aspect of the invention, an image processing apparatus synthesizing in a panoramic way a plurality of sub-images, one of which is preset as a representative image and is registered as an image information by the operation of a user, and creating a panoramic image includes a sampling image selecting unit selecting the representative image out of a plurality of the sub-images as the sampling image, a sampling unit sampling a plurality of pixels from the selected sampling image, a correction parameter establishing unit extracting features from a plurality of the sampled pixels and establishing a correction parameter for image correction based on the extracted features, and an image processing unit synthesizing a plurality of the sub-images in a panoramic way and simultaneously correcting the entire panoramic image based on the established correction parameter.

According to the aspect of the invention, one representative image preset from a plurality of sub-images by the operation of a user is selected as a sampling image, features are extracted from a plurality of the pixels sampled from the selected sampling image, an image correction parameter is established based on the extracted features, and a plurality of sub-images is synthesized in a panoramic way and the entire panoramic image is simultaneously corrected based on the established correction parameter. In this case, one representative image representing a plurality of sub-images established by a user will be usually established as the main portion of the panoramic image. In addition, according to the aspect, since a representative image is selected as a sampling image, the correction can be accomplished as the user desires. Further, since sub-images are selected as a sampling image, the correction can be quickly processed as compared to a case in which pixels are sampled from the entire panoramic image. As a result, when a plurality of sub-images is synthesized in a panoramic way to create a panoramic image, the entire panoramic image can be corrected well by simple processes. In this case, as a plurality of the sub-images, the images associated with each other for a panoramic image and compatible with standard recorded in one file may be used.

According to a fifth aspect of the invention, an image processing program allows a computer to perform as the image processing apparatus according to the above aspects of the invention. The program may be stored in the computer-readable recording medium (for example, hard disk, ROM, FD, CD, DVD etc.), transferred from a certain computer to other computers through a transmission medium (e.g., a network such as the Internet, a LAN etc.), or received and transferred in any other suitable forms. If the program is executed in a certain computer or executed in plural computers to share the respective steps therebetween, it serves as the image processing apparatus described above, and thereby the equivalent effect to the image processing apparatus can be obtained.

BRIEF DESCRIPTION OF THE DRAWINGS

The invention will be described with reference to the accompanying drawings, wherein like numbers reference like elements.

FIG. 6 is a flow chart illustrating an exemplary routine for selecting a sampling image.

DESCRIPTION OF EXEMPLARY EMBODIMENTS

Figure 1:
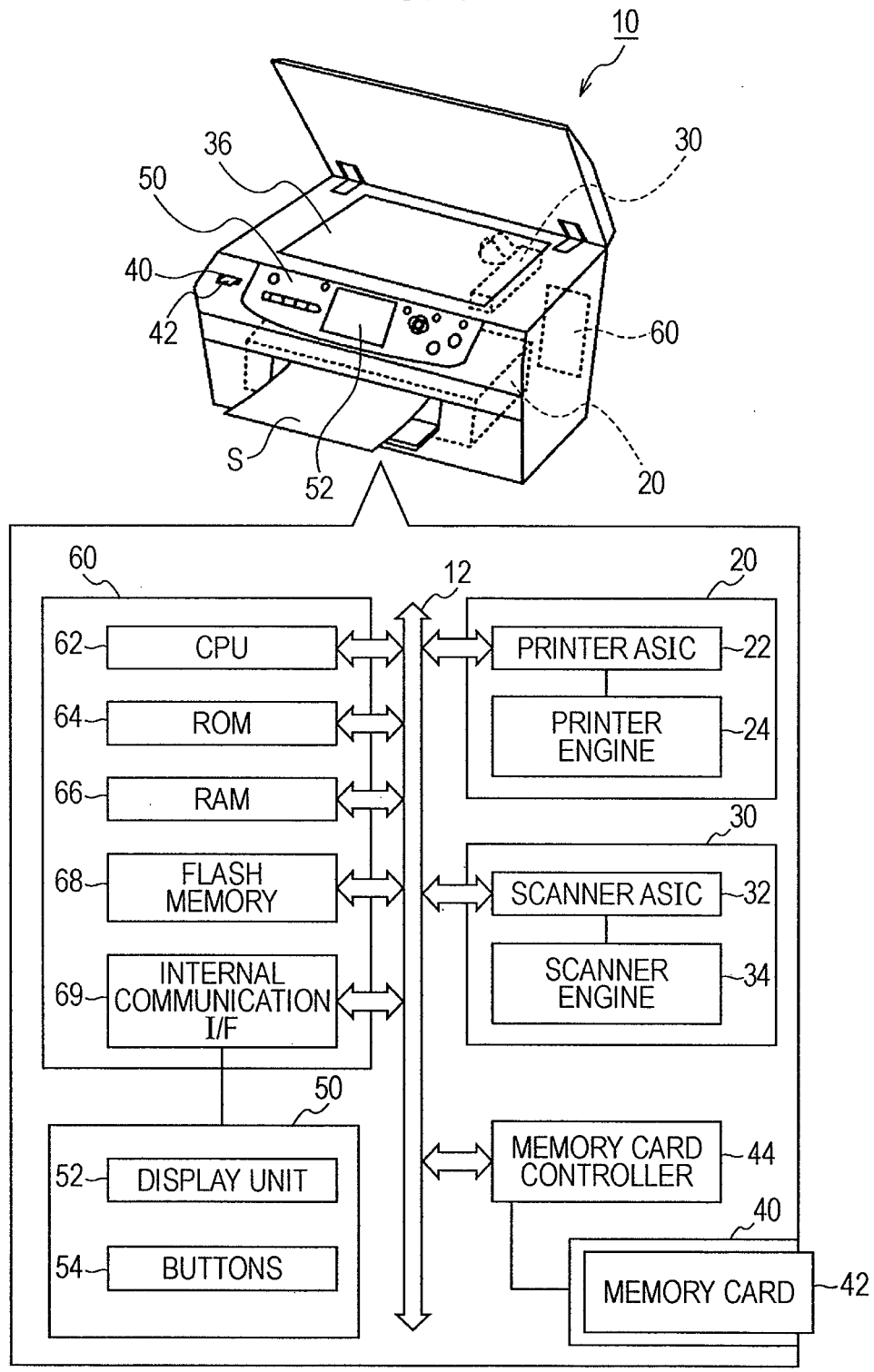
FIG. 1 is an outline view and a block diagram illustrating a multi-function printer.

Now, exemplary embodiments of the invention will be described with reference to accompanying drawings. FIG. 1 is an outline view and a block diagram illustrating schematic configuration of a multi-function printer 10 which is an exemplary embodiment of an image processing apparatus of the invention.

The multi-function printer 10 according to the exemplary embodiment includes, as shown in FIG. 1; a printer unit 20 executing the printing to a printing paper S based on a print job, a scanner unit 30 reading a document mounted on a glass board 36, a memory card controller 44 inputting/outputting a data to/from a memory card 42 inserted to a memory card slot 40, an operation panel 50 by which various information is displayed on a display unit 52 or a user instruction is inputted by the operation of buttons 54, and a main controller 60 responsible for control of the entire apparatus. The multi-function printer 10 is configured such that the printer unit 20, the scanner unit 30, the memory card controller 44, and the main controller 60 can exchange various control signals or data through a bus 12.

The printer unit 20 includes a printer ASIC 22 and a printer engine 24. The printer ASIC 22 is an integrated circuit controlling the printer engine 24, and if it receives a printing instruction from the main controller 60, it controls the printer engine 24 to print an image file which is an object of the printing instruction to a paper S. In addition, the printer engine 24 is configured as a known ink jet color printer mechanism which executes a printing job by ejecting ink from printing heads into a paper. Further, ASIC is an abbreviation of Application Specific Integrated Circuit.

The scanner unit 30 includes a scanner ASIC 32 and a scanner engine 34. The scanner ASIC 32 is an integrated circuit controlling the scanner engine 34, and if it receives a scan instruction from the main controller 60, it controls the scanner engine 34 to read out a document mounted on a glass board 36 as an image data. In addition, the scanner engine 34 is configured using a known image scanner and includes a known color image sensor which decomposes the reflected light from the paper into respective colors of red (R), green (G) and blue (B) to create scan data.

The memory card controller 44 inputs/outputs the data to/from the memory card 42 inserted into the memory card slot 40 provided to the side of the operation panel 50. The memory card controller 44 reads out a file stored in the memory card 42 and transmits this file to the main controller 60 or receives an instruction from the main controller 60, and writes the data in the memory card 42 depending on the instruction, when the memory card 42 is connected with the memory card slot 40. Hereinafter, a file stored in the memory card 42 will be described in detail.

Figure 2:
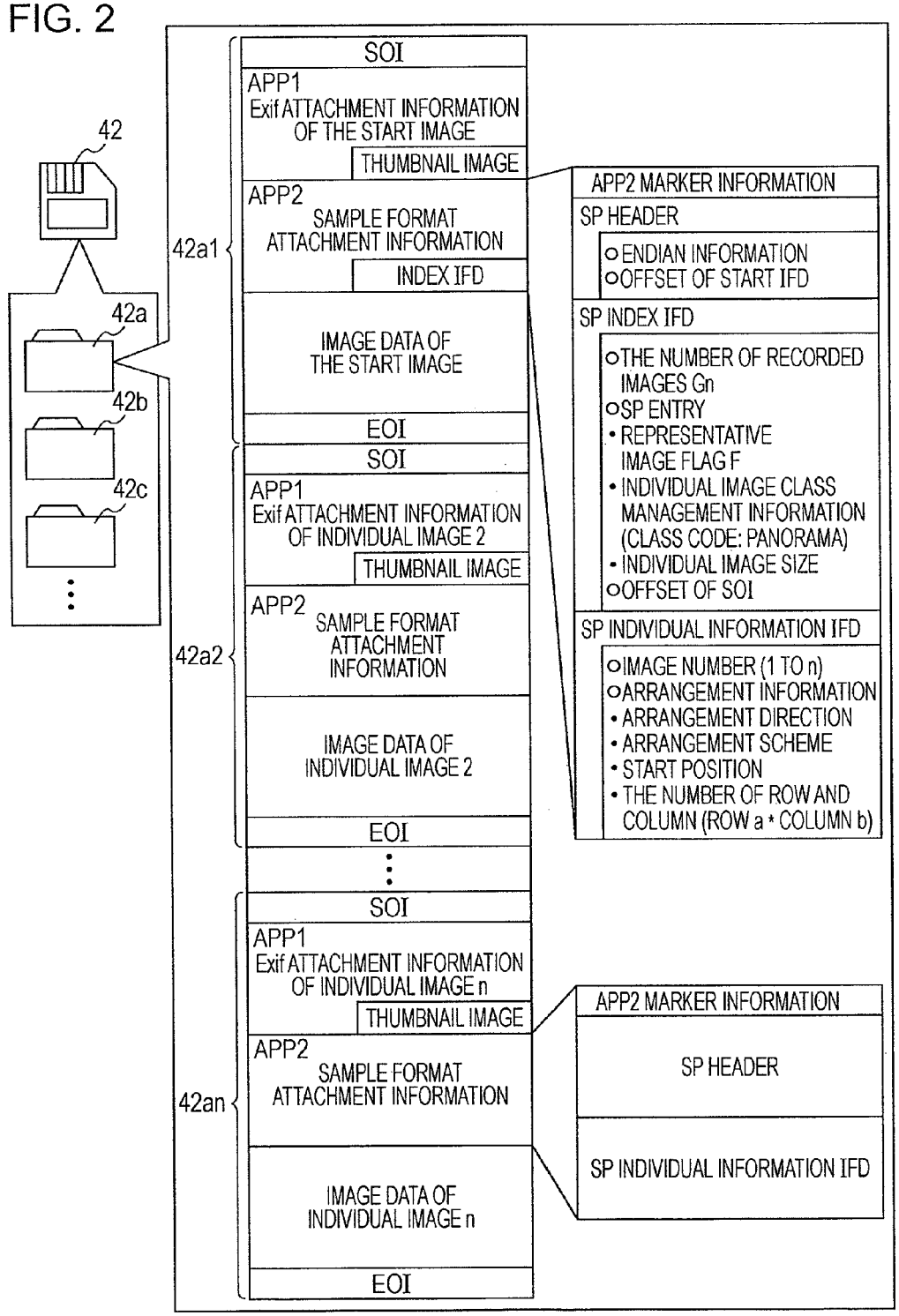
FIG. 2 is a diagram for explaining an exemplary data structure of an image stored in the memory card.
Figure 3A:
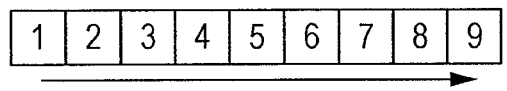
FIG. 3 is a diagram for explaining an exemplary arrangement of sub-images when the sub-images are synthesized in a panoramic way.

FIG. 2 is a diagram for explaining an exemplary data structure of a file stored in the memory card 42. As shown, a plurality of files 42a, 42b, 42c etc. is stored in the memory card 42. A plurality of data 42a1, 42a2, ..., 42an (where, n is the number of images) storing a JPEG data as image data is stored in respective files. Each data includes a SOI (Start Of Image) which is a marker indicating the start of the data, a marker segment APP1 in which an Exif attachment information regarding an image, such as the number of pixels, a photographed date, a diaphragm value, an image data size etc. and a thumbnail image in which the body of the image data is resized into a predetermined size are recorded, a marker segment APP2 in which the sample format attachment information specified in a sample format which is a standard regarding the respective data is recorded, a main body of JPEG type image data, and a EOI (End Of Image) which is a marker indicating the end of the data. As used herein, the term "sample format" refers to a standard of a data structure for integrally recording and arranging a plurality of individual images in the same file to use the recorded file, and the term "sample format" (hereinafter, referred to as "SP format"), is one example of this, but is not limited thereto. In addition, according to the exemplary embodiment, the SP format attachment information is recorded in the marker segment APP2, which is illustrative, and it may be recorded in any marker segment APPn (where, n is an integer), other than the marker segment APP2. The marker segment APP2 includes a SP header in which endian information indicating a byte sequence in the SP format attachment information and an offset indicating a relative offset from the endian information to the start IFD (Image File Directory) are recorded, a SP entry in which the number of recorded images Gn indicating the number of images stored in the file 42a, a group of data regarding individual images etc. are recorded, a SP Index IFD in which the configuration information of the entire file such as an offset to the SOI of the individual image is recorded, and a SP individual Information IFD in which an individual information such as the image number (1 to n) assigned to the individual images, arrangement information of the respective individual images etc. is recorded. These are equally recorded in the start image and the subsequent individual images, except that the SP Index IFD is recorded in the start image only. In addition, while not shown, in the respective IFDs, an offset of next IFD is recorded. In the SP entry of the SP Index IFD, individual image class management information in which a representative image flag F or a class code is recorded, or an individual image size indicating the data size from the SOI to the EOI of the individual image etc. are recorded. In the representative image flag F, value 1 is set for one individual image established by a user as a representative image out of a plurality of individual images and value 0 is set for the other individual images. Two or more representative images cannot be selected, but it is possible to select nothing, and, in that case, the representative image flags F for the individual images all become 0. In the class code, it is recorded whether or not it is a monitor display image for reproducing and displaying on a monitor, or whether or not it is a multiview-photographed image photographed at a plurality of different viewpoints etc. For the monitor display image, a plurality of codes can be recorded depending on the number of pixels, and, for example, a QVGA size or a VGA size etc. may be recorded. For a multiview-photographed image, a plurality of images individually photographed can be recorded, and, for example, a panorama-photographed image, a stereoscopic vision-photographed image etc. may be recorded. In the exemplary embodiment, it is assumed that "Panorama" indicating a panorama-photographed image is recorded as the class code and the arrangement information of the SP individual Information IFD is a panorama-photographed image. Further, the image included in the file 42a includes a start image and a plurality of individual images 2, 3, ..., n (where, n is the number of images), for simplicity, in the following description, these are referred to as "sub-images," without distinguishing between the start image and a plurality of the individual images. An exemplary arrangement of the sub-images when synthesized in a panoramic way by setting the number of recorded images Gn as value 9 is illustrated in FIG. 3. In FIG. 3, one square represents one sub-image, a number within the square represents an arrangement sequence of the respective sub-images and also the image number of the sub-image, and an arrow represents the shape in which the images are arranged successively. FIG. 3A illustrates an example in which the sub-images are arranged horizontally in one direction, and FIGS. 3B to 3E illustrate an example in which all the sub-images are arranged horizontally and vertically in two directions. FIGS. 3B to 3E are different from each other in the arrangement scheme, the arrangements shown in FIG. 3B, FIG. 3C, FIG. 3D, and FIG. 3E are referred to respectively as "clockwise direction", "counterclockwise direction," "zigzag column arrangement," and "zigzag row arrangement". In the arrangement information of the SP individual Information IFD, arrangement conditions, specifically, an arrangement direction in which whether or not the sub-images are arranged in either a horizontal direction or a vertical direction, or the sub-images are arranged in both a horizontal direction and a vertical direction is recorded, an arrangement scheme in which any one direction of from the left to the right, from the right to the left, from the top to the bottom, and from the bottom to the top is recorded as the arrangement direction of the sub-images in a case in which the arrangement direction is one direction, or otherwise any one direction of a clockwise direction, a counterclockwise direction, a zigzag column arrangement, and a zigzag row arrangement is recorded as the arrangement direction of the sub-images in a case in which the arrangement direction is both directions, a start position in which any one position of the upper right, the upper left, the lower right, and the lower left is recorded as the initial arrangement position of the images, and the number of rows and columns in which when the arrangement direction is both directions, the number of rows a arranged in a vertical direction and the number of columns b arranged in a horizontal direction are recorded, are recorded. Further, in the SP individual Information IFD, an overlapped volume specifying the volume overlapped with the adjacent sub-image when synthesized in a panoramic way etc. is recorded and, for simplicity, description and illustration thereof will be omitted.

The operation panel 50 includes a display unit 52 and a group of buttons 54. The display unit 52 is a liquid crystal display which displays the selection of various modes, the establishment of printing, a printing preview screen etc. A group of the buttons 54 includes an arrow key which is operated in the case of the selection of the various modes or various establishment etc., a start button which is pressed down when the printing of an image is executed, and a power source button which is operated when the switching-on/off of the power source is executed, and allows user instructions to be input to the main controller 60 through an internal communication interface 69. In this case, various selectable modes include a normal printing mode in which an image stored in the memory card 42 is selected and respectively printed, a panorama printing mode in which a plurality of sub-images associated with each other as a panoramic image such as the file 42a described above and stored in the memory card 42 is synthesized in a panoramic way and then the panoramic image is printed, a scan mode in which a document mounted on the glass board 36 is read out and stored in the memory card 42 as image data, and a copy mode in which a document is read out and copied.

The main controller 60 is configured using a microprocessor having CPU 62 as a main element, a ROM 64 in which various processing programs, various data, various tables etc. are stored, a RAM 66 in which scan data, printing data etc. are stored temporarily, a flash memory 68 in which data is electrically rewritable and maintained even if a power source is turned off, and an internal communication interface 69 allowing communication with the operation panel 50, which are connected with each other through bus 12 so as to exchange the signals. The main controller 60 receives various operation signals or various detection signals input from the printer unit 20, the scanner unit 30, and the memory card controller 44, or an operation signal occurring depending on the operation of a group of the buttons 54 in the operation panel 50. In addition, the main controller 60 outputs instructions to read out image data from the memory card 42 and to output the read data to the main controller 60 and to the memory card controller 44, outputs instructions to execute the printing of an image to the printer unit 20, outputs instructions to read out the document mounted on the glass board 36 to the scanner unit 30 based on the scan instruction input from a group of the buttons 54 of the operation panel 50, and outputs the control instructions input from display unit 52 to the operation panel 50.

Figure 4:
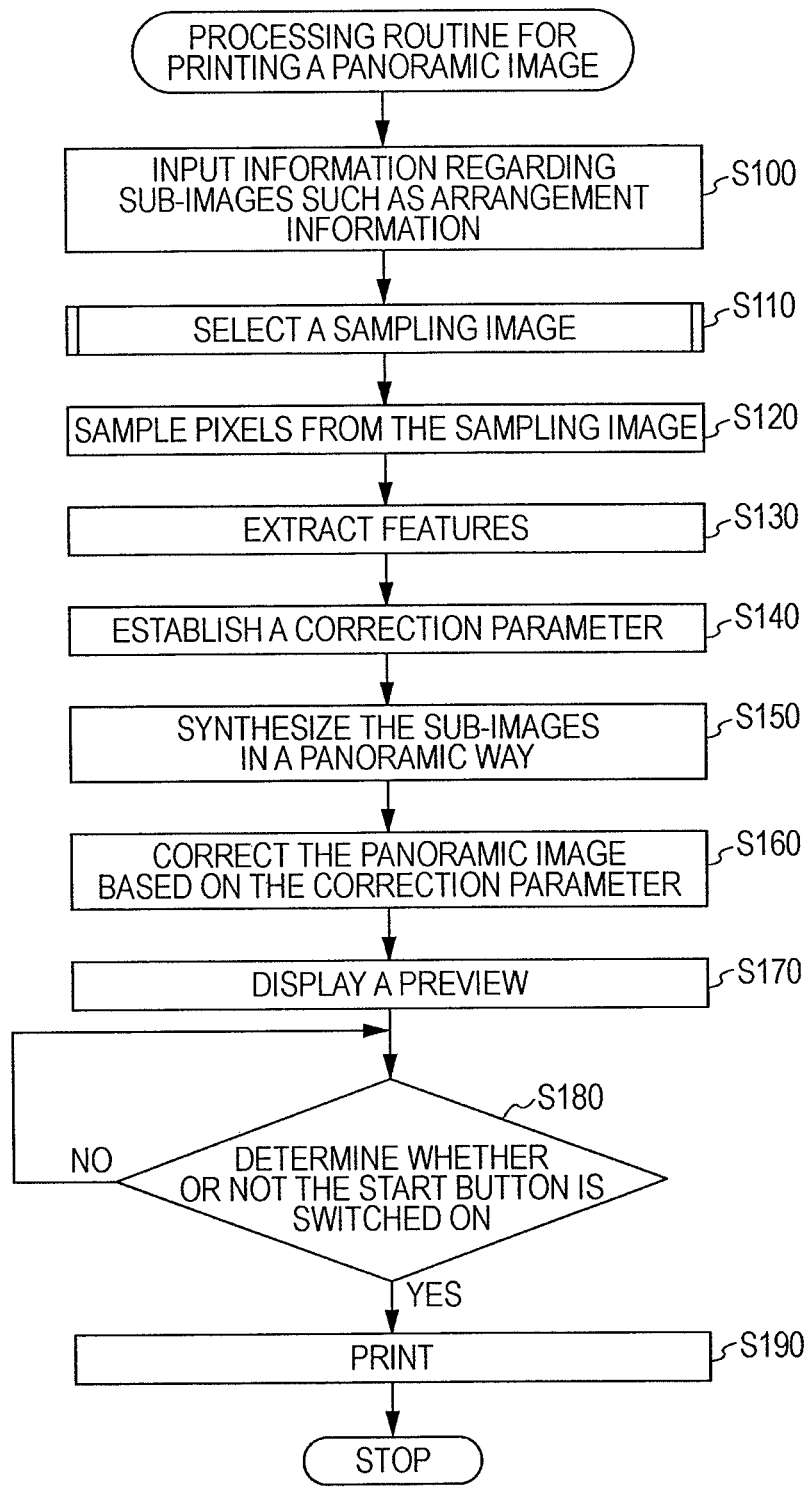
FIG. 4 is a flow chart illustrating an exemplary routine for printing a panoramic image.

Subsequently, an operation of the multi-function printer 10 according to the exemplary embodiment, in particular, when printing the panoramic image will be described herein below. FIG. 4 is a flow chart illustrating an exemplary routine for printing a panoramic image executed by the main controller 60. This process is executed when the memory card 42 is inserted to the memory card slot 40, any one of a plurality of files 42a, 42b, 42c, ... is selected by the operation of a group of the buttons 54, and the processing mode simultaneously enters the panorama printing mode.

Figure 5:
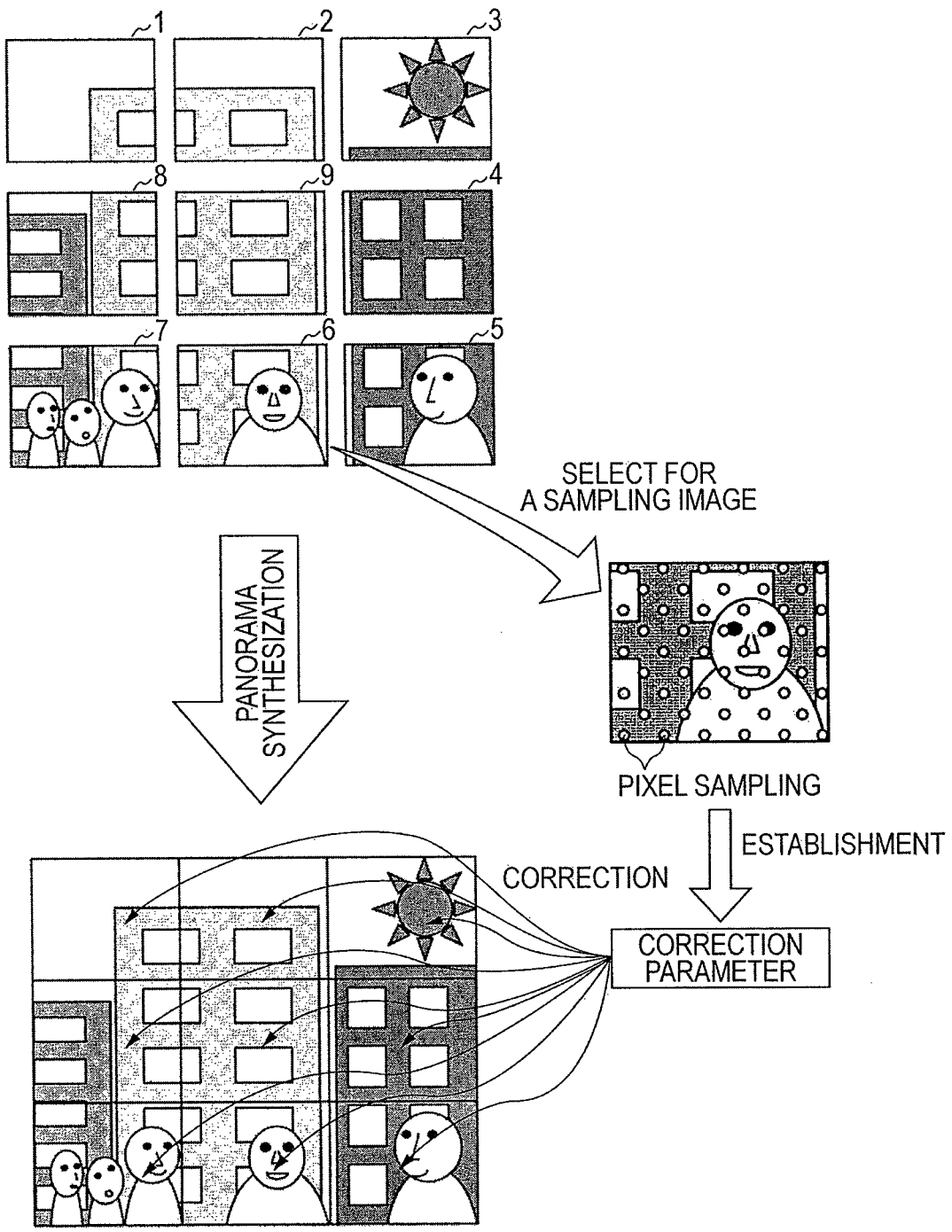
FIG. 5 is a diagram for explaining a state of synthesizing and correcting a panoramic image.

When the routine for printing a panoramic image is executed, initially, the CPU 62 of the main controller 60 inputs the necessary information for the panorama-synthesizing and the printing process of sub-images within the selected file, for example, the arrangement information, the overlapped volume included in the SP format attachment information etc. (step S100). Subsequently, the sampling image is selected out of a plurality of sub-images (step S110). This process is a process of selecting one sub-image out of a plurality of sub-images as a sampling image and detailed description thereof will be given later. When the sampling image is selected, a plurality of pixels is sampled from the selected sampling image (step S120). An RGB histogram or a brightness histogram is calculated from the RGB value of the sampled pixels and the features of the respective image quality parameters such as brightness, chroma, color balance, contrast, and sharpness are extracted (step S130). A correction parameter is established such that the extracted features are close to the features of the image quality parameter when an image has the desirable image quality (step S140). Subsequently, the sub-images are arranged depending on the arrangement information and synthesized in a panoramic way (step S150). The panoramic image is corrected based on the established correction parameter (step S160). When the panoramic image is corrected, the corrected image is preview-displayed on the display unit 52 (step S170). The CPU 62 of the main controller 60 waits for the start button out of a group of the buttons 54 to instruct the printing start by being pressed down (step S180). When the start button is pressed down, a printing process is executed (step S190), and the routine is completed. According to the embodiment, a correction parameter for correcting the entire panoramic image can be established based on the pixels sampled from the one selected sampling image and therefore the entire panoramic image can be corrected based on the established correction parameter. FIG. 5 is a diagram for explaining a configuration of the panorama synthesization and correction processes executed by the routine. FIG. 5 illustrates a shape in which 9 sheets of sub-images are synthesized in a panoramic way and corrected. As shown, the sub-image of image number 6 is selected as a sampling image, a correction parameter is established by sampling pixels from the sub-image of image number 6, and the entire panoramic image is corrected based on the correction parameter established with respect to the panoramic image in which the sub-images 1 to 9 are synthesized. As a result, the hue of the panoramic image does not change in parts to a great extent, as compared to a case of establishing the correction parameters for respective sub-images by respectively sampling pixels from a plurality of sub-images, correcting the respective sub-images based on the established correction parameters and thereafter synthesizing in a panoramic way. Furthermore, since the image size being sampled is smaller and the number of pixels is smaller as compared to a case of sampling pixels from a panoramic image after a synthesizing process, the correction parameter can be established quickly. A sampling image selection process of selecting a sampling image will be described in detail herein below. FIG. 6 is a flow chart illustrating an exemplary routine for selecting a sampling image.

Figure 7:
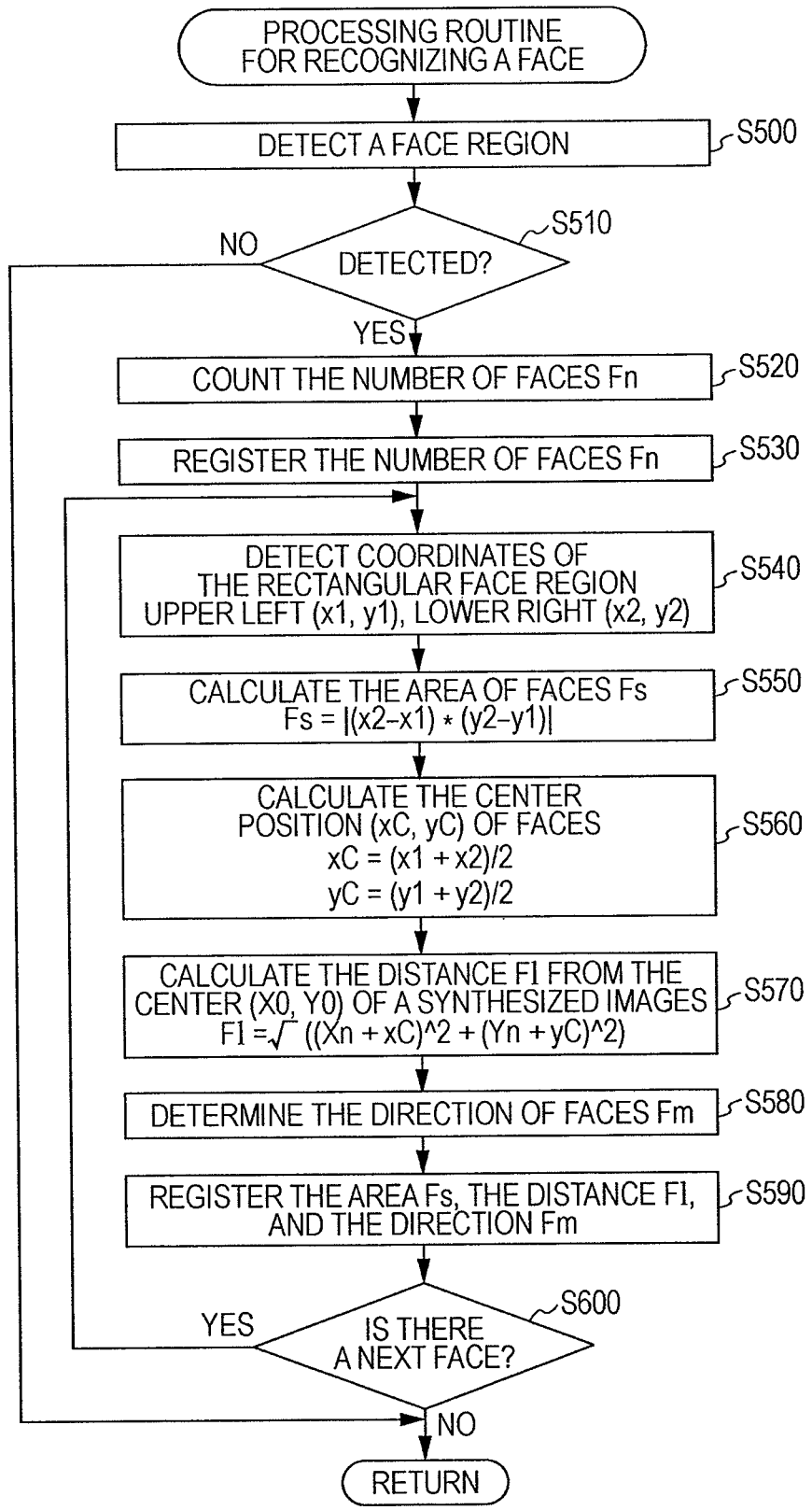
FIG. 7 is a flow chart illustrating an exemplary routine for recognizing a face.

When the routine for selecting a sampling image is executed, initially, the CPU 62 of the main controller 60 inputs the number of recorded images Gn from the SP format attachment information (step S200) and establishes the processing value N for the selection process as value 1 (step S210). Subsequently, a thumbnail image data of sub-images in which the image number n corresponds to the processing value N, is input (step S220). Since the processing value N is currently established as value 1, the thumbnail image data of the image number 1 is input. When the thumbnail image data is input, a face recognition process detecting a face region is performed (step S230). Now, description regarding the sampling image selection process is stopped, and the face recognition process will be described in detail hereinafter. FIG. 7 is a flow chart illustrating an exemplary routine for recognizing a face.

Figure 8A:
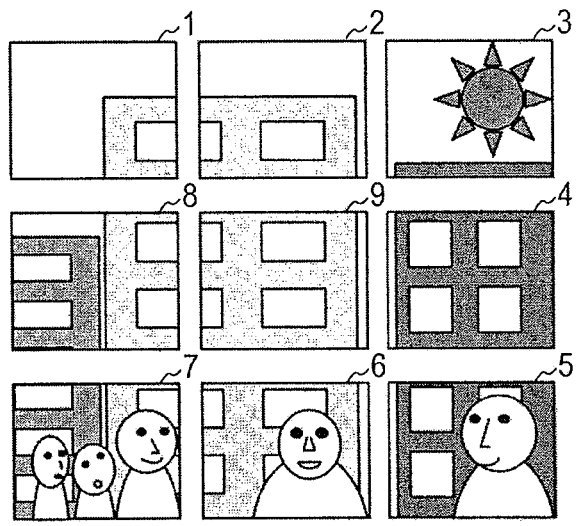
FIG. 8 is a diagram for explaining an exemplary image file stored in the memory card.
Figure 8B:
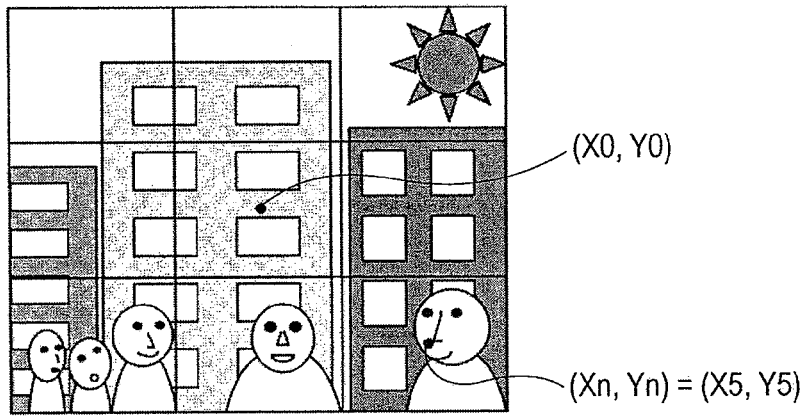
Figure 8C:
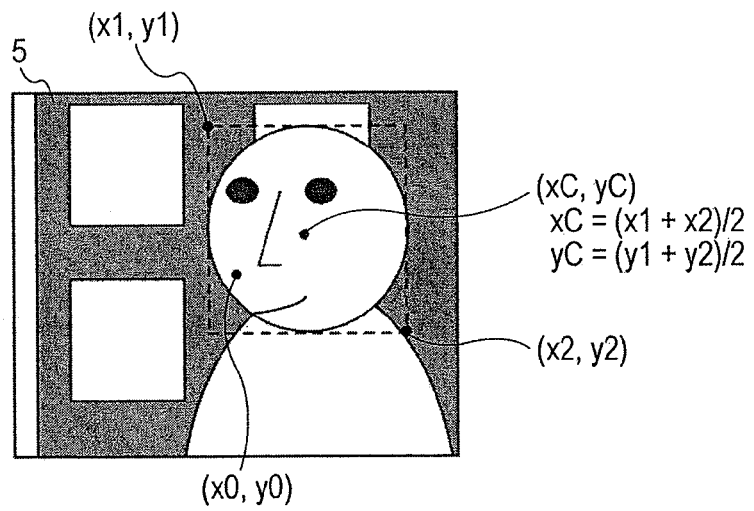

When the face recognition process routine is executed, initially, the CPU 62 of the main controller 60 performs the detection of a face region (step S500), and determines whether or not the face region can be detected (step S510). In this case, the detection of the face region includes, for example, a way in which a group of pixels of skin color in which pixels of an image having a color similar to skin color are gathered in more than a certain number, is extracted as a face candidate region with a rectangle, and the time when an eye is extracted is determined as a case in which a face is recognized. Further, determination as to whether or not the color is skin color is made depending on whether or not the RGB value for respective pixels is within a predetermined range of the RGB value of the skin color, which is determined previously in RGB color space. The extraction of an eye is performed by extracting a region in which two regions out of the extracted face candidate regions lower than others in brightness exist side by side. An exemplary sub-image stored in the file 42a within the memory card 42 is illustrated in FIG. 8. FIG. 8A illustrates each element of sub-images, FIG. 8B illustrates a panoramic image synthesized the sub-images in a panoramic way, and FIG. 8C illustrates an enlarged view of the sub-image of the image number 5. As shown in FIG. 8A, the image numbers are successively established from 1 to 9 in the arrangement sequence of a clockwise direction, a person is included in the sub-images of the image numbers 5 to 7, and no person is included in the other sub-images. Thus, for example, at step S510, the routine determines a face is not detected within the sub-image of the image number 1, and then the routine is completed. On the other hand, for example, at step S510, the routine determines a face is detected within the sub-image of the image number 5, and counts the extracted number of the face regions, i.e., the number of faces Fn (step S520). The counted number of faces Fn is registered in the RAM 66 (step S530). Subsequently, an upper left coordinate (x1, y1) and a lower right coordinate (x2, y2) on a diagonal line in the rectangular face region are detected (step S540). The coordinates are detected, as shown in FIG. 8C, by calculating position coordinates at the xy coordinates system in which the center positions of the respective sub-images are determined as the origins (x0, y0). When the coordinates are detected, the area of the rectangular region is calculated as the area of faces Fs by the following formula (1) (step S550), and the center position coordinate (xC, yC) of a face is detected by the following formulas (2) and (3) (step S560). Subsequently, the distance Fl is calculated from the center of the panoramic image in which the sub-images are synthesized, to the center of a face (step S570). In this case, as shown in FIG. 8B, a XY coordinates system in which the center position of the panoramic image is set as the origin (X0, Y0) is determined separately with the xy coordinates systems of the sub-images, and the center positions of the respective sub-images (i.e., corresponding to the origin (x0, y0) at xy coordinates systems of the respective sub-images) are determined as the coordinate (Xn, Yn) (where, n is an image number) in the panoramic image. For example, the center position coordinate (x0, y0) of the image number 5 is represented as a coordinate (X5, Y5) at a XY coordinates system, and therefore the center position coordinate (xC, yC) of a face of the image number 5 is converted to a coordinate (X5+xC, Y5+yC) at a XY coordinates system. Further, the distance Fl can be calculated by the following formula (4). In addition, the direction of faces Fm is determined (step S580). In this case, the determination as to the direction of faces Fm is made, for example, by previously storing a plurality of face images having different directions of faces (an angle of a face swung toward the left and right when determined the front direction as 0 degree), comparing a plurality of the stored face images with the detected face region, for example, using the pattern matching in the position of an eye, and detecting the most similar angle of the face image as the direction of faces Fm. Thereafter, the detected area Fs, the distance Fl and the direction Fm are registered in the RAM 66 as a face-recognized result (step S590), and determination is made as to whether or not a subsequent face is detected (step S600). When a subsequent face exists, a process after step S540 is repeated, and when a subsequent face does not exist, the routine is completed.

$$Fs=|(x2-x1)*(y2-y1)| \quad (1)$$

$$xC=(x1+x2)/2 \quad (2)$$

$$yC=(y1+y2)/2 \quad (3)$$

$$Fl=\sqrt{((Xn+xC)^2+(Yn+yC)^2)} \quad (4)$$

Figure 9:
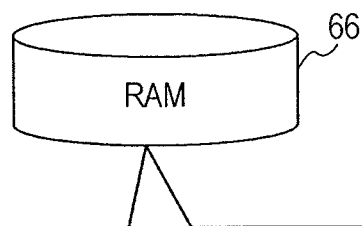
FIG. 9 is a diagram for explaining an exemplary face-recognized result registered in the RAM.

Returning to the sampling image selection process routine, after the face recognition process is executed, the processing value N is increased by 1 (step S240). Determination is made as to whether or not the value N exceeds value Gn (step S250). When the value N does not exceed this, the routine is returned back to step S220, and the process is repeated. An exemplary face-recognized result registered in the RAM 66 by repeating these processes is illustrated in FIG. 9. As shown, for every image in which a face was detected, the number Fn, the area Fs, the distance Fl, and the direction Fm are registered respectively. In this case, for the direction Fm, for example, the right (i.e., Ra degrees) indicates that the angle of a face swung toward the right is Ra degrees. In addition, for the image of the image number 7, three faces are detected, and for the three detected faces, respectively the area Fs, the distance Fl, and the direction Fm are registered.

When the value N exceeds the value Gn at step S250, for all sub-images, determination is made that the face recognition process is completed and determination is made as to whether or not an image having a detected face exists (step S260). When an image having a detected face exists, determination is made as to whether or not there is a plural number of sub-images having a detected face (step S270). When there is only one sub-image having a detected face, the sub-image is selected as the sampling image (step S280) and then the routine is completed. In this case, when the panoramic image is an image including a person's face, the person's face is apt to be an attractive portion and thus usually the main portion of the panoramic image. Thus, by establishing the correction parameter based on the sub-images having a recognized face, suitable image correction for the main portion of the panoramic image can be performed on the entire panoramic image and thereby the correction can be accomplished as the user desires.

On the other hand, when a plural number of sub-images having a detected face exist at step S270, the number Fn, the area Fs, the distance Fl, and the direction Fm of faces are input from the face-recognized result registered to the RAM 66 shown as an example in FIG. 9 (step S290). Subsequently, determination is made as to whether or not the number of sub-images in which the distance Fl is the minimum is one (step S300), as to whether or not the number of sub-images in which the number Fn is the maximum is one (step S320), as to whether or not the number of sub-images in which the area Fs is the maximum is one (step S340), and as to whether or not the number of sub-images in which the direction Fm is the minimum is one (step S360). In this case, for the direction Fm, a face directed toward the front direction (i.e., the swing angle of a face is 0 degree) is determined as the minimum. When a face directing toward the front direction does not exist, a face in which the absolute value in the swing angle of a face is smallest is determined as the minimum. When the sub-image in which the distance Fl is the minimum at step S300 is determined as 1, the sub-image is selected as a sampling image (step S310). When the sub-image in which the number Fn is the maximum at step S320 is determined as 1, the sub-image is selected as a sampling image (step S330). When the sub-image in which the area Fs is the maximum at step S340 is determined as 1, the sub-image is selected as a sampling image (step S350). When the sub-image in which the direction Fm is the minimum at step S360 is determined as 1, the sub-image is selected as a sampling image (step S370). Thereafter, the routine is completed. For example, in the embodiment shown in FIG. 8, the distance of faces Fl2 of the image number 6 is smaller than the distance Fl1 of the image number 5 or the distance Fl3 to Fl5 of the image number 7, an image in which the distance Fl is the minimum is determined as 1 at step S300, and the sub-image of the image number 6 is selected as a sampling image at subsequent step S310. In this case, when plural faces exist, a portion in which a face is closer to the center of the panoramic image, a portion in which the number of faces is greater, a portion in which the size of a face is larger, and a portion in which the direction of a face is closer to the front direction are very attractive portions. Thus, by comparison with the respective items of the distance Fl, the number Fn, the area Fs and the direction Fm, and selecting a sub-image including an attractive portion as a sampling image, even if sub-images in which a face was recognized exist in a plural number, the panoramic image can be corrected well.

On the other hand, when an image in which the direction Fm is the minimum is not determined as 1 at step S360, or when determination is made that an image having a detected face does not exist at step S260 described above, the representative image flag F of the respective sub-images is input from the SP format attachment information (step S380) and determination is made as to whether or not an image in which the flag F is 1 exists (step S390). When an image in which the representative image flag F is 1 exists, the image is selected as a sampling image (step S400). When an image in which the representative image flag F is 1 does not exist, the start image in the file 42a, i.e. the sub-image of the image number 1, is selected as a sampling image (step S410). Thereafter, the routine is completed. In this case, for the representative image flag F, an image which represents a plurality of sub-images within the file 42a is established by a user, and usually the image is established so as to include the main portion of the panoramic image. Thus, by selecting the representative image as a sampling image even though a face is not detected, suitable image correction for the main portion of the panoramic image can be performed on the entire panoramic image and thereby the correction can be accomplished as the user desires.

Now, the corresponding relationship between the elements of the embodiment and the elements of the invention will be described clearly. The main controller 60 of the embodiment executing the sampling image selection process step S230 of the process routine in FIG. 6 and the face recognition process routine in FIG. 7 correspond to the "face recognition unit" of the invention. The main controller 60 executing the process step S110 of the panoramic image printing processing routine in FIG. 4 and the process steps S260 to S410 of the sampling image selection process routine in FIG. 6 correspond to the "sampling image selecting unit". The main controller 60 executing the process step S120 of the panoramic image printing processing routine in FIG. 4 corresponds to the "sampling unit." The main controller 60 executing the process steps S130 to S140 of the panoramic image printing processing routine in FIG. 4 corresponds to the "correction parameter establishing unit." The main controller 60 executing the process steps S150 to S160 of the panoramic image printing processing routine in FIG. 4 corresponds to the "image processing unit."

According to the multi-function printer 10 of the exemplary embodiment described above in detail, since a sub-image in which a face is recognized from a plurality of sub-images is selected as a sampling image, a correction parameter is established by sampling a plurality of pixels from the selected sampling image, a plurality of sub-images is synthesized in a panoramic way, and the entire panoramic image is simultaneously corrected based on the correction parameter, suitable image correction for the main portion of the panoramic image can be performed on the entire panoramic image and thereby the correction can be accomplished as the user desires. In addition, since a sub-image is selected as a sampling image, the correction is quickly processed as compared to a case in which pixels are sampled from the entire panoramic image. As a result, when a panoramic image is formed by synthesizing a plurality of sub-images in a panoramic way, the entire panoramic image can be corrected well by simple processes. Further, when plural faces exist, by selecting a sub-image including an attractive face as a sampling image, correction can be further improved. In addition, when a sub-image in which a face is recognized does not exist, the sampling image is selected based on the representative image flag F which is usually established as the sub-image including a main portion of the panoramic image. Thus, even though a face is not detected, the image correction can be accomplished as the user desires.

Further, the invention is not limited to the exemplary embodiments described above, and various variations, modifications and changes are made without departing from the technical scope of the invention.

While the correction is, but is not limited to being, performed after a panorama synthesization process in the embodiments, the sub-images can be synthesized in a panoramic way after correction based on the same correction parameter for all sub-images.

While the correction parameter is established in the panoramic image printing processing routine in the embodiment, the correction parameter can be established in advance. For example, when the memory card 42 is inserted to the memory card slot 40, a sampling image can be selected from the images stored in a file of the memory card 42, a correction parameter can be preset based on the selected sampling image, and then the correction parameter can be stored in the RAM 66.

While when images in which a face is detected exist in a plural number, the distance Fl, the number Fn, the area Fs, and the direction Fm are respectively compared with each other in sequence and an sampling image is selected, in the embodiment, it is not limited thereto, any other suitable comparison sequence may be used when comparing the distance Fl, the number Fn, the area Fs, and direction Fm. In addition, without being limited to a case in which the sampling image is selected based on the four items of the distance Fl, the number Fn, the area Fs, and direction Fm, any one item of the four items may be used, and any two items or three items may be used.

Figure 10:
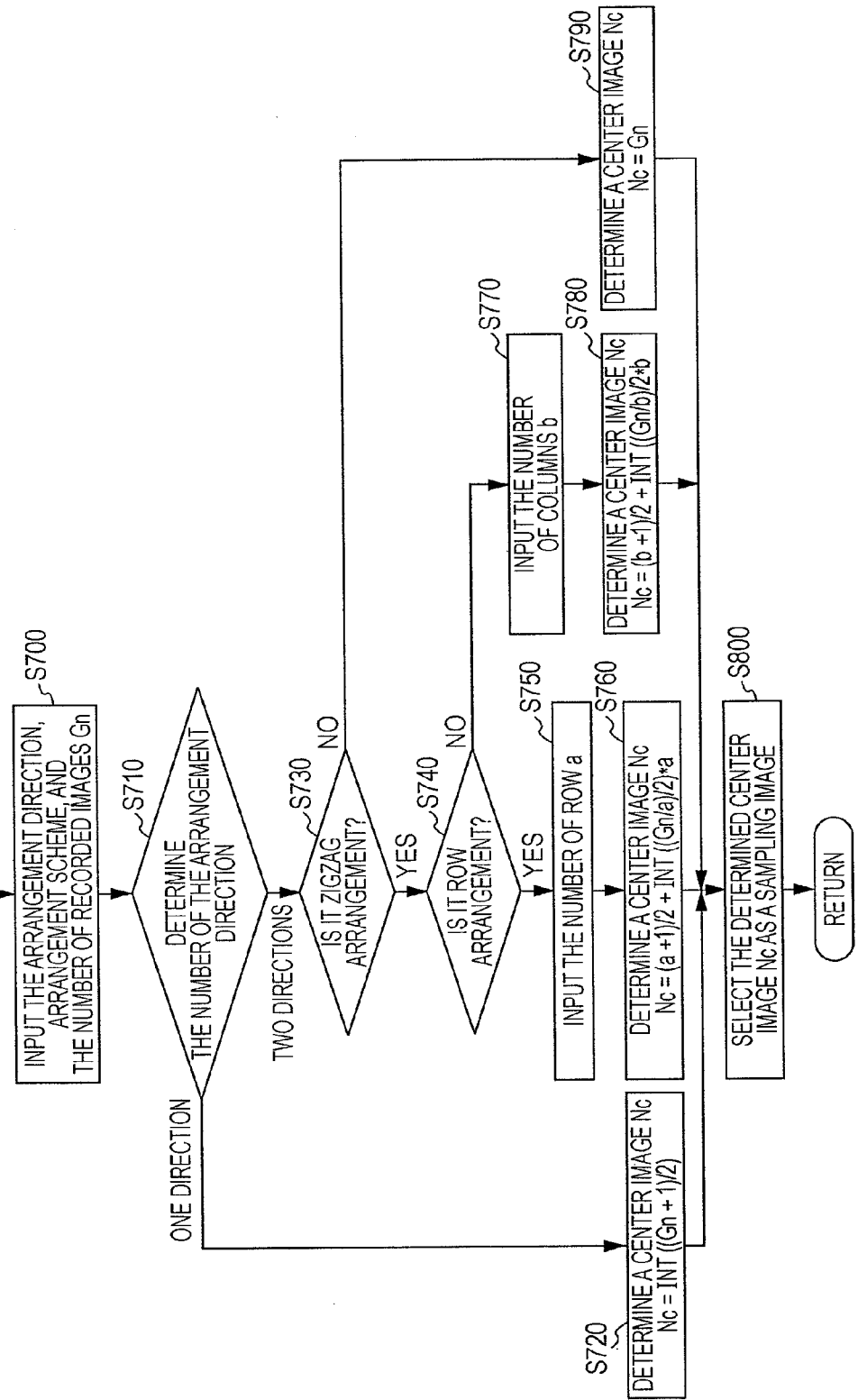
FIG. 10 is a flow chart illustrating an alternative routine for selecting a sampling image.

While a sub-image in which a face is recognized is selected as a sampling image in the embodiment, it is not limited thereto, a sub-image (hereinafter, referred to as a "center image Nc") which is disposed at the center when synthesized in a panoramic way, may be selected as a sampling image. In this case, instead of the sampling image selection process routine in FIG. 6, the sampling image selection process routine shown as an alternative embodiment in FIG. 10 may be executed. The sampling image selection process routine shown in FIG. 10 will be described hereinafter. When the routine is executed, initially, the CPU 62 of the main controller 60 inputs arrangement information such as the number of recorded images Gn included in the SP format attachment information, the arrangement direction or the arrangement scheme (step S700) and determines whether the arrangement direction is one direction or both directions (step S710). When the arrangement direction is one direction, for example, as shown in FIG. 3A, since images are arranged in one row (or, one column) and the center image Nc is the center image of the arrangement sequence, the center image Nc is determined by the following formula (5) (step S720) and the determined center image Nc is selected as a sampling image (step S800). Thereafter, the routine is completed. Further, the function "INT" in the formula is to perform the rounding of fractions by which a largest integer is returned out of integers of not more than a given numerical value, and for example, when a formula ((Gn+1)/2) is value 4.5, value 4 is returned. On the other hand, when the arrangement direction is both directions, determination is made as to whether or not the direction is the zigzag arrangement (step S730). When the direction is the zigzag arrangement, determination is made as to whether or not the direction is the row arrangement (see FIG. 3E) (step S740). When the direction is the row arrangement, the number of rows a is input (step S750) and the center image Nc is determined by the following formula (6) (step S760). The determined center image Nc is selected as a sampling image at step S800. Thereafter, the routine is completed. On the other hand, when the direction is the column arrangement (see FIG. 3D), the number of columns b is input (step S770) and the center image Nc is determined by the following formula (7) (step S780). The determined center image Nc is selected as a sampling image at step S800. Thereafter, the routine is completed. On the other hand, when the direction is not the zigzag arrangement, since images are arranged in a clockwise direction (see FIG. 3B) or in a counterclockwise direction (see FIG. 3C) and the center image Nc is the last image of the arrangement sequence, the center image Nc is determined by the following formula (8) (step S790). The determined center image Nc is selected as a sampling image at step S800. Thereafter, the routine is completed. Generally, the main subject of the photograph is arranged in the center in the panoramic image. Thus, according to the embodiment, since a correction parameter is established based on the sub-image arranged in approximately the center of the panoramic image, suitable image correction for the main portion of the panoramic image can be performed on the entire panoramic image and thereby the correction can be accomplished as the user desires. As a result, an equivalent effect to the embodiment can be obtained.

$$Nc=INT((Gn+1)/2) \qquad (5)$$

$$Nc=(a+1)/2+INT((Gn/a)/2)*a \qquad (6)$$

$$Nc=(b+1)/2+INT((Gn/b)/2)*b \qquad (7)$$

$$Nc=Gn \qquad (8)$$

Figure 11:
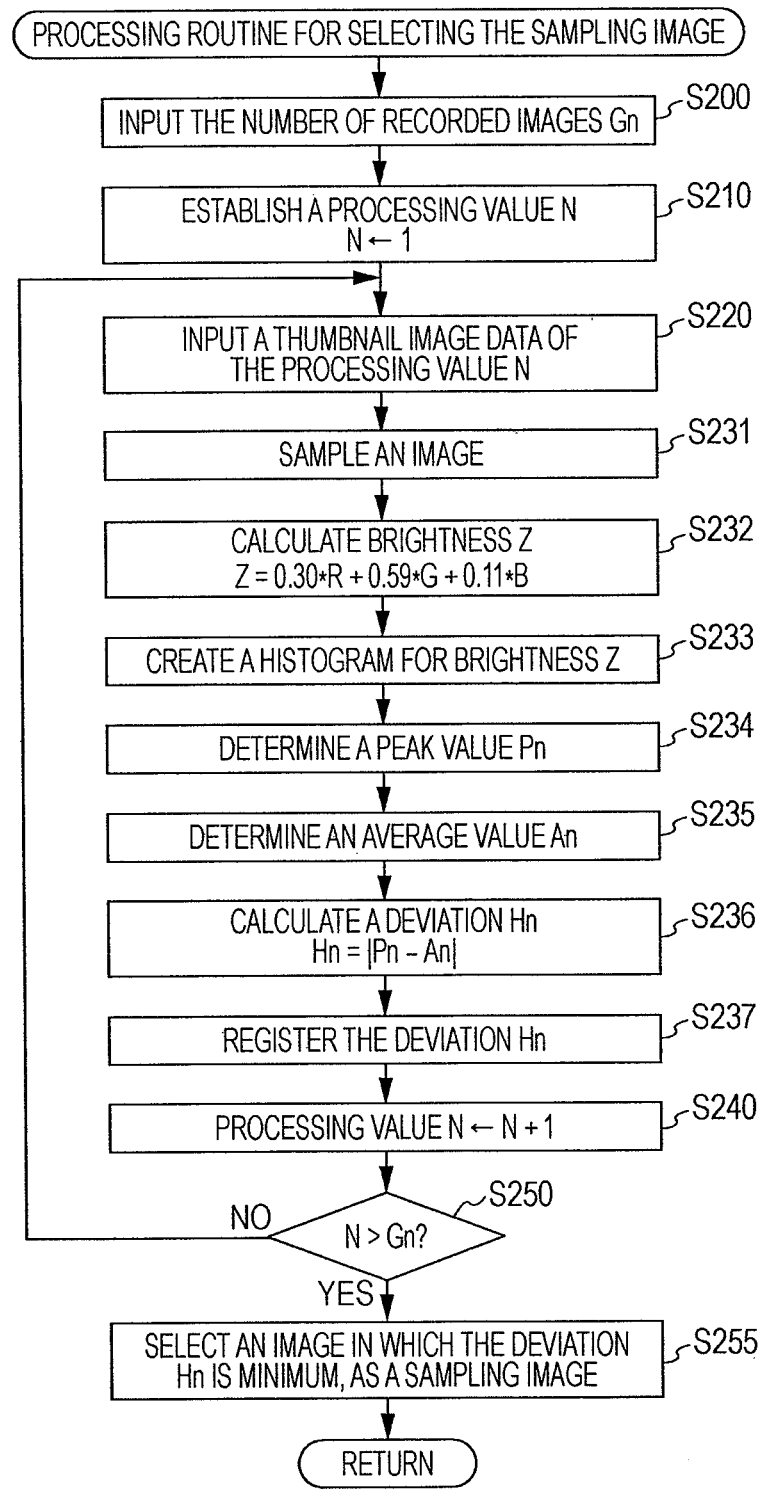
FIG. 11 is a flow chart illustrating an alternative routine for selecting a sampling image.
Figure 12:
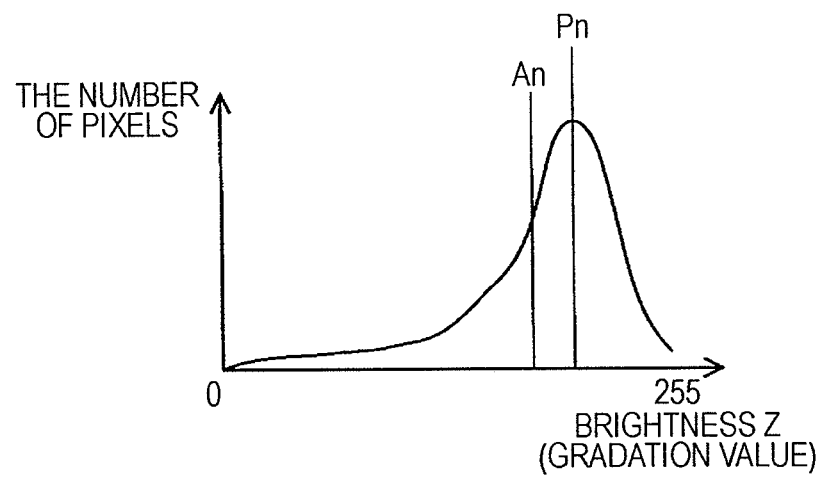
FIG. 12 is a diagram for explaining an exemplary histogram.
Figure 13A:
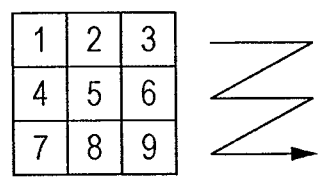
FIG. 13 is a diagram for explaining the arrangement of the sub-images in the alternative embodiment.
Figure 13B:
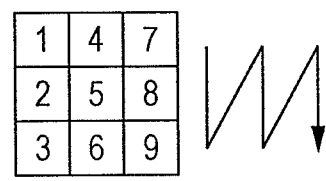

While a sub-image in which a face is recognized is selected as a sampling image in the embodiment, it is not limited thereto, a sub-image in which the brightness in an image is the most uniform may be selected as a sampling image. In this case, instead of the sampling image selection process routine in FIG. 6, the sampling image selection process routine shown as an alternative embodiment in FIG. 11 may be executed. Hereinafter, the processing routine shown in FIG. 11 will be described. Further, similar steps to FIG. 6 identify like step numbers in the sampling image selection process routine in FIG. 11, and for simplicity, description thereof will be omitted. When the thumbnail image data is input at step S220, a plurality of pixels is sampled from the thumbnail image data (step S231) and brightness Z is calculated from the RGB data of the sampled respective pixels using the following formula (9) (step S232). Further, the symbols "R", "G", and "B" in the formula indicate respectively the gradation value of RGB for the respective pixels. Subsequently, a histogram regarding brightness Z is created (step S233). The created histogram is illustrated as an example in FIG. 12. As shown, the horizontal axis indicates the gradation value (0 to 255) of brightness Z and the vertical axis indicates the number of pixels as frequency. When a histogram is created, the peak value Pn is determined (step S234) and the average value An is determined (step S235). The peak value Pn is the gradation value in which the number of pixels is greatest and the average value An is a value which is obtained by summing up the products of the respective gradation values and the number of pixels and dividing the summed value by the total number of pixels. Subsequently, the absolute value of the difference between the determined peak value Pn and the average value An is calculated as a deviation Hn (step S236), and the calculated deviation Hn is registered in the RAM 66 (step S237). Further, the process is repeated until the processing value N exceeds the value Gn at step S250. When the processing value N exceeds the value Gn, an image in which the deviation Hn is the minimum is selected as a sampling image from a list of the deviation Hn for the respective sub-images registered in the RAM 66 (step S255). In this case, an image in which the deviation Hn is large, i.e., an image in which the difference between the peak value Pn and the average value An is very high, will, to a great extent, have extremely bright positions in parts or extremely dark positions within its image. When the entire panoramic image is corrected based on the correction parameter established from such an image, undesirable image quality will be obtained. On the other hand, an image in which the Hn is small, i.e., an image in which the difference between the peak value Pn and the average value An is not high, has relatively uniform brightness. Thus, even though the entire panoramic image is corrected based on the correction parameter established from such an image, image quality causing a sense of incongruity is rarely obtained. According to the alternative embodiment, since a sub-image in which the deviation Hn between the peak value Pn and the average value An is smallest, i.e., a uniform sub-image in which the number of extremely bright positions or dark positions is small, is selected as a sampling image, the correction can be accomplished as the user desires. An equivalent effect to the embodiment can be obtained.

$$Z=0.30*R+0.59*G+0.11*B \qquad (9)$$

While when no sub-image in which a face is included is detected by the face recognition process, the sampling image is selected based on a value of the representative image flag F in the embodiment, it is not limited thereto, the sampling image may be selected based on the value of the representative image flag F, without performing the face recognition process. In this case, the processes of steps S200 to S370 in the sampling image selection process routine in FIG. 6 may be omitted and the processes at steps S380 to S410 may be performed.

While the embodiment has been illustrated where the data structure of a file stored in the memory card 42 includes a SOI (Start Of Image) indicating the start of the data, an Exif attachment information, a marker segment APP1 recording the thumbnail image, a marker segment APP2 recording the SP format attachment information, a main body of JPEG type image data, and a EOI indicating the end of the data (End Of Image), the data structure or the data recorded in the respective marker segments is only an example and is not limiting. For example, the image data is a JPEG format. In addition to the JPEG format, the image data may include any other suitable file types such as a BMP format, a GIF format, and a TIFF format. In addition, the SP format attachment information may be recorded in any other marker segment APPn (where, n is an integer), other than the marker segment APP2.

Figure 3B:
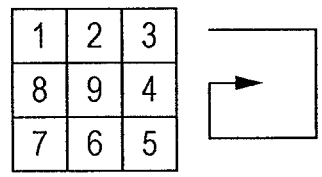
Figure 3C:
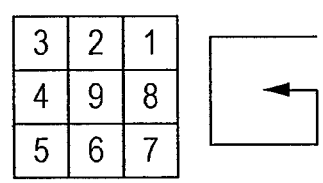
Figure 3D:
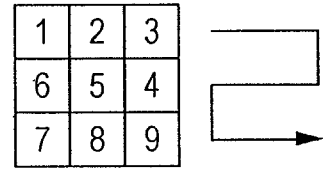
Figure 3E:
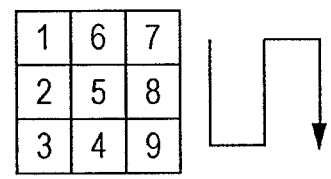

While the zigzag column arrangement is the arrangement shown in FIG. 3D and the zigzag row arrangement is the arrangement shown in FIG. 3E in the embodiment, the zigzag column arrangement may be implemented as the arrangement shown in FIG. 3A and the zigzag row arrangement may be implemented as the arrangement shown in FIG. 3B. In addition, the one direction in the arrangement is not limited to the horizontal direction as shown in FIG. 3A and may include a vertical direction. Further, while the number of rows a and the number of columns b are all 3, any other integer of one or more may be used.

While in the present embodiment an image file is read out from the memory card 42, it may be read out from any other recording media. For example, the image file may be read out from the RAM 66 receiving and temporarily storing these image files from digital cameras by infrared communication, may be read out from a memory within a digital camera connected by USB connection, and may be read out from the RAM 66 receiving and temporarily storing these image files from other computers on computer networks (e.g., the Internet). In these cases, an infrared communication board, a USB controller, and a network interface board may be provided so as to implement respectively an infrared communication, an USB connection, a network connection.

While the embodiment has been described in which the invention is applied to the multi-function printer 10 including the printer unit 20 and the scanner unit 30, the invention is equally applicable to a printer not having the scanner unit 30.

Furthermore, while the embodiment employs the full color printer 10, which employs an ink jet type and uses ink as a coloring agent, as a printer, a color laser printer employing an electronograph scheme and using a toner as a coloring agent, or a color printer employing the thermal transfer scheme and using an ink ribbon as a coloring agent may be employed. Further, a printing apparatus such as a FAX machine or a copier may be employed. In addition, the image processing apparatus is not only limited to the printer, the invention is equally applicable to an image processing apparatus such as a PC, a digital camera and a digital video.

What is claimed is:

1. An image processing apparatus synthesizing a plurality of sub-images in a panoramic way to create a panoramic image, comprising:
   a face recognizing unit recognizing a person's face in one or more detected face regions from the plurality of sub-images, thereby determining one or more sub-images each having the person's face in the one or more detected face regions, wherein the face recognizing unit determines a number of face regions having one or more faces recognized in the one or more sub-images having the person's face;
   a sampling image selecting unit selecting a sampling image which has the person's face recognized by the face recognizing unit, out of the plurality of sub-images in a panoramic way to create a panoramic image, wherein the sub-images are arranged adjacent and abut each other in a grid to create the panoramic image having a larger scope than each of the sub-images in the plurality of sub-images;
   a sampling unit sampling a plurality of pixels from the selected sampling image to obtain a plurality of sampled pixels, wherein the sampling image selecting unit selects the sampling image which has the most determined number of face regions having the one or more faces recognized, from the one or more sub-images having the person's face from the face recognizing unit;
   a correction parameter establishing unit extracting features from the plurality of the sampled pixels from the sampling unit, and establishing a correction parameter for image correction based on the extracted features, wherein the correction parameter is established such that the extracted features are within a predetermined range of an image quality parameter; and
   an image processing unit synthesizing the plurality of the sub-images in a panoramic way and simultaneously correcting the entire panoramic image based on the established correction parameter from the correction parameter establishing unit, wherein the sample image selecting units creates the panoramic image by detecting a center coordinate of a face region in the number of face regions determined by the face recognizing unit and finding a distance from a center of the panoramic image to the center of the face region.

2. The image processing apparatus according to claim 1, wherein
   the face recognizing unit determines a position of the person's face recognized in the one or more sub-images having the person's face, and
   the sampling image selecting unit selects a sampling image which includes the person's face disposed nearest to its center when synthesized in a panoramic way, from the one or more sub-images having the person's face.

3. The image processing apparatus according to claim 1, wherein
   the face recognizing unit determines size of the person's face recognized in the one or more sub-images having the person's face, and
   the sampling image selecting unit selects a sampling image which has the largest determined size of the person's face, from the one or more sub-images having the person's face.

4. The image processing apparatus according to claim 1, wherein
   the face recognizing unit determines a direction of the person's face recognized in the one or more sub-images having the person's face, and
   the sampling image selecting unit selects a sampling image which has the determined direction of the person's face nearest to the front direction, from the one or more sub-images having the person's face.

* * * * *